United States Patent [19]

Nishio

[11] Patent Number: 5,541,590
[45] Date of Patent: *Jul. 30, 1996

[54] VEHICLE CRASH PREDICTIVE AND EVASIVE OPERATION SYSTEM BY NEURAL NETWORKS

[75] Inventor: Tomoyuki Nishio, Kawasaki, Japan

[73] Assignee: Takata Corporation, Tokyo, Japan

[*] Notice: The term of this patent shall not extend beyond the expiration date of Pat. No. 5,377,108.

[21] Appl. No.: 375,249

[22] Filed: Jan. 19, 1995

Related U.S. Application Data

[63] Continuation of Ser. No. 97,178, Jul. 27, 1993, abandoned.

[30] Foreign Application Priority Data

Aug. 4, 1992 [JP] Japan ................................ 4-229201

[51] Int. Cl.⁶ ........................................... G08G 1/16
[52] U.S. Cl. ................... 340/903; 340/435; 348/148; 364/424.04; 395/23; 395/905
[58] Field of Search ...................... 340/435, 995, 340/903, 905; 348/170, 113, 148, 149; 364/424.01, 424.04, 424.05; 395/905.22, 11, 21, 23; 382/104, 157

[56] References Cited

U.S. PATENT DOCUMENTS

| | | | |
|---|---|---|---|
| 5,130,563 | 7/1992 | Nabet et al. | 364/807 |
| 5,161,014 | 11/1992 | Pearson et al. | 395/11 |
| 5,161,632 | 11/1992 | Asayama | 340/435 |
| 5,162,997 | 11/1992 | Takahashi | 364/424.1 |
| 5,189,619 | 2/1993 | Adachi et al. | 340/903 |
| 5,200,898 | 4/1993 | Yuhara et al. | 364/431.04 |
| 5,214,744 | 5/1993 | Schweizer et al. | 364/807 |
| 5,249,157 | 9/1993 | Taylor | 340/903 |
| 5,270,708 | 12/1993 | Kamishima | 340/905 |
| 5,282,134 | 1/1994 | Gioutsos et al. | 364/424.01 |
| 5,285,523 | 2/1994 | Takahashi | 364/424.01 |
| 5,377,108 | 12/1994 | Nishio | 364/424.05 |
| 5,434,927 | 7/1995 | Brady et al. | 348/148 |

FOREIGN PATENT DOCUMENTS

| | | |
|---|---|---|
| 0358628 | 3/1990 | European Pat. Off. |
| 2554612 | 5/1985 | France. |
| 3837054 | 6/1989 | Germany. |
| 4001493 | 7/1991 | Germany. |
| 04008639 | 1/1992 | Japan. |
| 9002985 | 3/1990 | WIPO. |

OTHER PUBLICATIONS

Rumelhart et al "Parallel Distributed Processing", vol. 1 pp. 161, 162, copyrighted 1986.

*Primary Examiner*—Brent A. Swarthout
*Attorney, Agent, or Firm*—Kanesaka & Takeuchi

[57] ABSTRACT

A system for predicting and evading crash of a vehicle includes an image pick-up device mounted on the vehicle for picking up images of actual ever-changing views when the vehicle is on running to produce actual image data, a crash predicting device associated with said image pick-up device, said crash predicting device being successively supplied with the actual image data for predicting occurrence of crash between the vehicle and potentially dangerous objects on the roadway to produce an operational signal when there is possibility of crash and a safety drive ensuring device connected to said crash predicting device for actuating, in response to the operational signal, an occupant protecting mechanism which is operatively connected thereto and equipped in the vehicle. The crash predicting device includes a neural network which is previously trained with training data to predict the possibility of crash, the training data representing ever-changing views previously picked-up from said image picking-up device during driving of the vehicle for causing actual crash.

4 Claims, 7 Drawing Sheets

VEHICLE CRASH PREDICTIVE AND EVASIVE OPERATION SYSTEM BY NEURAL NETWORKS

This application is a continuation of application Ser. No. 08/097,178, filed Sep. 27, 1993, now abandoned.

BACKGROUND OF THE INVENTION

This invention generally relates to a system for predicting and evading crash of a vehicle, in case of In driving a car, a driver unconsciously senses various conditions through the objects in view and, as a case may be, he must take an action to evade any possible crash or collision. However, drivers will often be panicked at the emergency. Such a panicked driver may not properly handle the vehicle. Besides, the response delay to stimuli in varying degrees is inherent to human beings, so that it is physically impossible in some cases to evade crash or danger. With this respect, various techniques have been developed to evade collision by means of mounting on a vehicle a system for determining the possibility of crash in a mechanical or electrical manner before it happens. Accidents could be reduced if drivers had an automatic system or the like warning of potential collision situations.

An automobile collision avoidance radar is typically used as this automatic system. Such an automobile collision avoidance radar is disclosed in, for example, M. Kiyoto and A. Tachibana, Nissan Technical Review: Automobile Collision-Avoidance Radar, Vol. 18, Dec. 1982 that is incorporated by reference herein in its entirety. The radar disclosed comprises a small radar radiation element and antennas installed at the front end of a vehicle. A transmitter transmits microwaves through the radiation element towards the headway. The microwave backscatter from a leading vehicle or any other objects as echo returns. The echo returns are received by a receiver through the antennas and supplied to a signal processor. The signal processor carries out signal processing operation to calculate a relative velocity and a relative distance between the object and the vehicle. The relative velocity and the relative distance are compared with predetermined values, respectively, to determine if the vehicle is going to collide with the object. The high possibility of collision results in activation of a proper safety system or systems.

However, the above mentioned radar system has a disadvantage of faulty operation or malfunctions, especially when the vehicle implementing this system passes by a sharp curve in a road. The radar essentially detects objects in front of the vehicle on which it is mounted. The system thus tends to incorrectly identify objects alongside the road such as a roadside, guard rails or even an automobile correctly running on the adjacent lane.

An intelligent vehicle has also been proposed that comprises an image processing system for cruise and traction controls. The views ahead the vehicle are successively picked up as image patterns. These image patterns are subjected to pattern matching with predetermined reference patterns. The reference patterns are classified into some categories associated with possible driving conditions. For example, three categories are defined for straight running, right turn and left turn. When a matching result indicates the presence of potentially dangerous objects in the picked up image, a steering wheel and a brake system are automatically operated through a particular mechanism to avoid or evade crash to that object.

The image processing system of the type described is useful in normal driving conditions where the pattern matching can be effectively made between the image patterns successively picked up and the reference patterns for safety driving control. However, image patterns representing various conditions on the roadway should be stored previously in the intelligent vehicle as the reference patterns. Vehicle orientation at initiation of crash varies greatly, so that huge numbers of reference patterns are required for the positive operation. This means that only a time-consuming calculation will result in a correct matching of the patterns, which is not suitable for evading an unexpected crash.

It is, of course, possible to increase operational speed of the pattern matching by using a large image processor. However, such a processor is generally complex in structure and relatively expensive, so that it is difficult to apply the same as the on-vehicle equipment. In addition, on-vehicle image processors, if achieved, will perform its function sufficiently only in the limited applications such as a supplemental navigation system during the normal cruising.

SUMMARY OF THE INVENTION

An object of the present invention is to provide a system for predicting and evading crash of a vehicle using neural networks.

Another object of the present invention is to provide a system capable of training neural networks by means of collected image data representing scenes along the moving direction of a vehicle until the vehicle collides with something.

It is yet another object of the present invention to provide a system for predicting crash though matching operation between data obtained on driving a vehicle and data learned by neural networks. It is still another object of the present invention to provide a system for evading crash of a vehicle using neural networks to actuate a vehicle safety system for protecting an occupant.

In order to achieve the above mentioned objects, the present invention is provided with a system for predicting and evading crash of a vehicle comprising: an image pick-up device mounted on the vehicle for picking up images of ever-changing views when the vehicle is on running to produce image data; a crash predicting circuit associated with the image pick-up device, the crash predicting circuit being successively supplied with the image data for predicting occurrence of crash between the vehicle and potentially dangerous objects on the roadway to produce an operational signal when there is possibility of crash; and a safety driving ensuring device connected to the crash predicting circuit for actuating, in response to the operational signal, occupant protecting mechanism which is operatively connected thereto and equipped in the vehicle; wherein the crash predicting circuit comprises a neural network which is previously trained with training data to predict the possibility of crash, the training data representing ever-changing views previously picked-up from the image picking-up device during driving of the vehicle and just after actual crash.

The neural network comprises at least an input layer and an output layer, and the training data are supplied to the input layer while the output layer is supplied with, as teacher data, flags representing expected and unexpected crash, respectively, of the vehicle. In addition, the neural network may comprise a two-dimensional self-organizing competitive learning layer as an intermediate layer.

Other advantages and features of the present invention will be described in detail in the following preferred embodiments thereof.

DETAILED DESCRIPTION OF THE PREFERRED EMBODIMENTS

Figure 1:
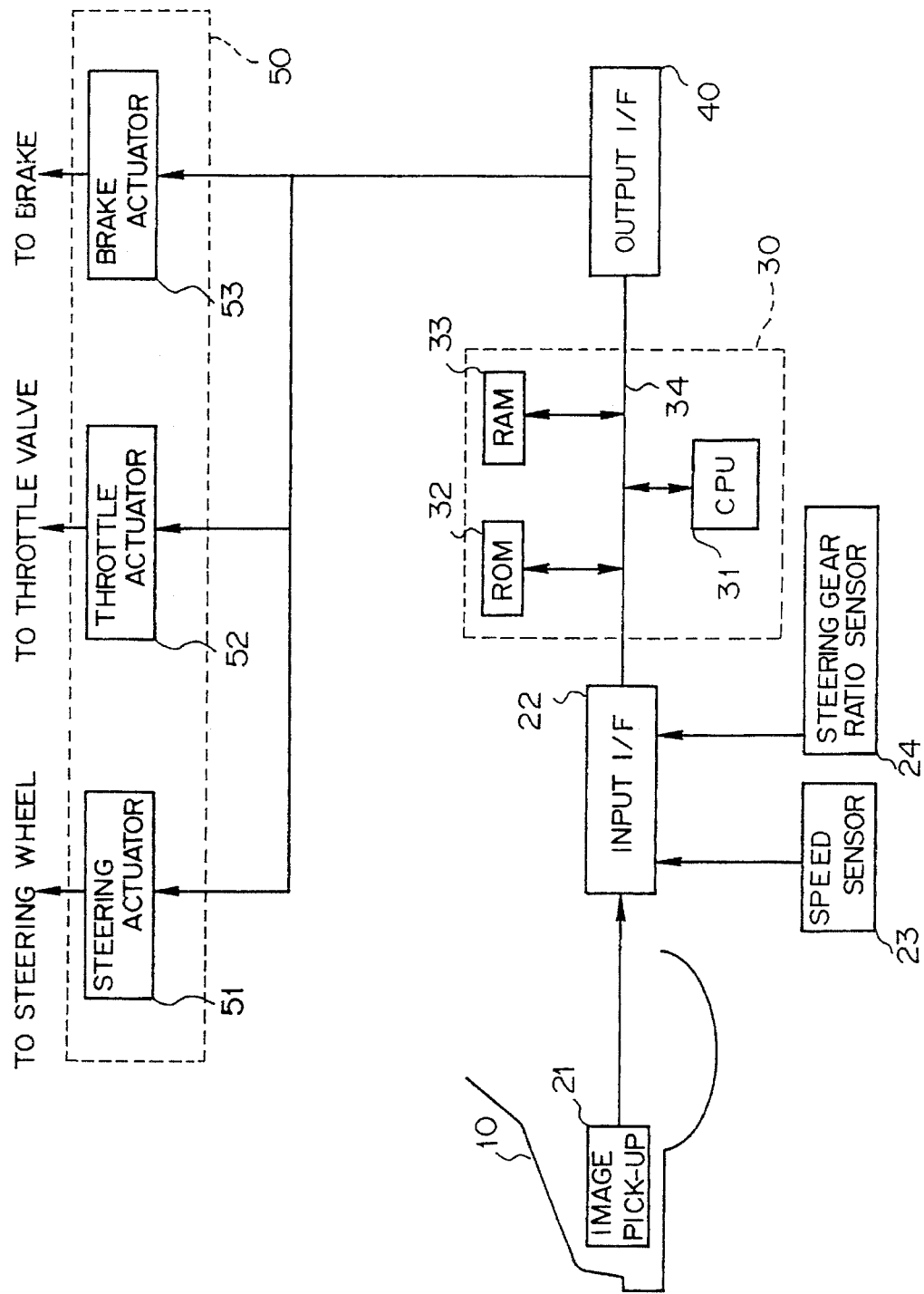
FIG. 1 is a block diagram of a conventional system for predicting and evading crash of a vehicle.

A conventional system for predicting and evading crash of a vehicle is described first to facilitate an understanding of the present invention. Throughout the following detailed description, similar reference numerals refer to similar elements in all figures of the drawing.

In the following description, the term "crash" is used in a wider sense that relates to all unexpected traffic accidents. Accidents other than crash include a turnover or fall of a vehicle, with which the phenomenon of "crash" is associated in some degrees, so that the term crash is used as a cause of traffic accidents.

As shown in FIG. 1, an image pick-up device 21 is mounted at a front portion of an automobile 10 to pick up ever-changing images as analog image data. This image pick-up device 21 is any one of suitable devices such as a charge-coupled-device (CCD) camera. The image data are subject to sampling for a sampling range $_\Delta T$ at a predetermined sampling interval $_\Delta t$. The image data are collected up to crash. In this event, the image pick-up range of the image pick-up device 21 corresponds to a field of view observed through naked eyes.

The image pick-up device 21 is connected to an input interface 22. The analog image data obtained by the image pick-up device 21 are supplied to the input interface 22. The input interface 22 serves as an analog-to-digital converter for converting the analog image data into digital image data. More particularly, the picked up images are digitized by means of dividing the same into tiny pixels (data elements) isolated by grids. It is preferable to eliminate noises and distortions at this stage. The input interface 22 is also connected to a speed sensor 23, a steering gear ratio sensor 24 and a signal processor 30. The speed sensor 23 supplies velocity data to the signal processor 30 through the input interface 22. The velocity data represents an actual velocity of the automobile 10 at the time instant when the image pick-up device 21 picks up an image of a view. Likewise, the steering gear ratio sensor 24 supplies steering gear ratio data to the signal processor 30 through the input interface 22. The steering gear ratio data represents an actual steering gear ratio of the automobile 10.

The signal processor 30 comprises a central processing unit (CPU) 31, a read-only memory (ROM) 32 and a random-access memory (RAM) 33. CPU 31, ROM 32 and RAM 33 are operatively connected to each other through a data bus 34. To evade potentially dangerous objects, CPU 31 carries out calculation operation in response to the image, velocity and steering gear ratio data given through the input interface 22. CPU 31 performs proper functions according to programs stored in ROM 32 and RAM 33. The outputs of the signal processor 30 is transmitted through an output interface 40. ROM 32 stores a table relating to numerical values required for the calculation. It also stores a table representing operational amount for a safety drive ensuring arrangement 50. On the other hand, RAM 33 stores programs for use in calculating an optimum operational amount for the safety drive ensuring arrangement 50. A program for this purpose is disclosed in, for example, Teruo Yatabe, Automation Technique: Intelligent Vehicle, pages 22–28.

The signal processor 30 first determines, according to the picked up image data, whether there is a space available on the roadway to pass through. When there is enough space to pass through and a potentially dangerous object is present on the roadway, the signal processor 30 calculates optimum operational amount for the safety drive for ensuring arrangement 50 to operate the same. In FIG. 1, the safety drive ensuring arrangement 50 consists of a steering actuator 51, a throttle actuator 52 and a brake actuator 53. If the signal processor 30 determines that it is necessary to operate these actuators, it produces steering gear ratio command, set velocity command, and brake operation command. The steering actuator 51, the throttle actuator 52 and the brake actuator 53 are operated depending on the condition in response to the steering gear ratio command, the set velocity command and the brake operation command, respectively.

The actuators are for use in actuating occupant protecting mechanism such as a brake device. Operation of these actuators is described now.

The steering actuator 51 is a hydraulic actuator for use in rotating steering wheel (not shown) in an emergency. In this event, the steering wheel is automatically rotated according to the steering gear ratio and rotational direction indicated by the steering gear ratio command. The operational amount of the steering or hydraulic actuator can be controlled in a well-known manner through a servo valve and a hydraulic pump, both of which are not shown in the figure.

The throttle actuator 52 acts to adjust opening amount of a throttle valve (not shown) to decrease speed while evading objects or so on.

The brake actuator 53 performs a function to gradually decrease speed of a vehicle in response to the brake operational command. The brake actuator 53 is also capable of achieving sudden brake operation, if necessary.

As mentioned above, CPU 31 carries out its operation with the tables and programs stored in ROM 32 and RAM 33, respectively, calculating for all picked up image data.

The conventional system is thus disadvantageous in that the calculation operation requires relatively long time interval as mentioned in the preamble of the instant specification.

On the contrary, a system according to the present invention uses image data representing ever-changing views picked up from a vehicle until it suffers from an accident. These image data are used for training a neural network implemented in the present system. After completion of the training, the neural network is implemented in a utility vehicle and serves as a decision making circuit for starting safety driving arrangements to evade crash, which otherwise will certainly happen. The neural network predicts crash and evades the same by means of properly starting an automatic steering system or a brake system.

A well-known neural network is described first to facilitate an understanding of the present invention and, following which preferred embodiments of the present invention will be described with reference to the drawing.

A neural network is the technological discipline concerned with information processing system, which is still in a development stage. Such artificial neural network structure is based on our present understanding of biological nervous systems. The artificial neural network is a parallel, distributed information processing structure consisting of processing elements interconnected unidirectional signal channels called connections. Each processing element has a single output connection that branches into as many collateral connections as desired.

A basic function of the processing elements is described below.

Figure 2:
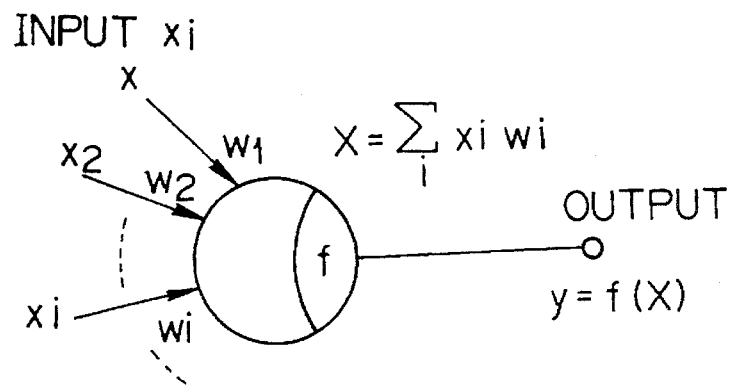
FIG. 2 is a schematic view showing a processing element in atypical neural network.

As shown in FIG. 2, each processing element can receive any number of incoming functions while it has a single output connection that can fan out to form multiple output connections. Thus the artificial neural network is by far more simple than the networks in a human brain. Each of the input data $x1, x2, \ldots, xi$ is multiplied by its corresponding weight coefficient $w1, w2, \ldots, wi$, respectively, and the processing element sums the weighted inputs and passes the result through a nonlinearity. Each processing element is characterized by an internal threshold or offset and by the type of nonlinearity and processes a predetermined transfer function to produce an output $f(X)$ corresponding to the sum $(X=\sum xi \cdot wi)$. In FIG. 2, $xi$ represents an output of an i-th processing element in an (s-1)-th layer and $wi$ represents a connection strength or the weight from the (s-1)-th layer to the s-th layer. The output $f(X)$ represents energy condition of each processing element. Though the neural networks come in a variety of forms, they can be generally classified into feedforward and recurrent classes. In the latter, the output of each processing element is fed back to other processing elements via weights. As described above, the network has an energy or an energy function that will be minimum finally. In other words, the network is considered to have converged and stabilized when outputs no longer change on successive iteration. Means to stabilize the network depends on the algorithm used.

The back propagation neural network is one of the most important and common neural network architecture, which is applied to the present invention. In this embodiment, the neural network is used to determine if there is a possibility of crash. When the neural network detects the possibility of crash, it supplies an operational command to a safety ensuring unit in a manner described below. As well known in the art, the back propagation neural network is a hierarchical design consisting of fully interconnected layers of processing elements. More particularly, the network architecture comprises at least an input layer and an output layer. The network architecture may further comprise additional layer or N hidden layers between the input layer and the output layer where N represents an integer that is equal to or larger than zero. Each layer consists of one or more processing elements that are connected by links with variable weights. The net is trained by initially selecting small random weights and internal thresholds and then presenting all training data repeatedly. Weights are adjusted after every trial using information specifying the correct result until weights converge to an acceptable value. The neural network is thus trained to automatically generate and produce a desired output for an unknown input.

Basic learning operation of the back propagation neural network is as follows. First, input values are supplied to the neural network as the training data to produce output values, each of which is compared with a correct or desired output value (teacher data) to obtain information indicating a difference between the actual and desired outputs. The neural network adjusts the weights to reduce the difference between them. More particularly, the difference can be represented by a well-known mean square error. During training operation, the network adjusts all weights to minimize a cost function equal to the mean square error. Adjustment of the weights is achieved by means of back propagation transferring the error from the output layer to the input layer. This process is continued until the network reaches a satisfactory level of performance. The neural network trained in the above mentioned manner can produce output data based on the input data even for an unknown input pattern.

The generalized delta rule derived with the steepest descent may be used to optimize the learning procedure that involves the presentation of a set of pairs of input and output patterns. The system first uses the input data to produce its own output data and then compares this with the desired output. If there is no difference, no learning takes place and otherwise the weights are changed to reduce the difference. As a result of this it becomes possible to converge the network after a relatively short cycle of training.

To train the net weights input data (training data) are successively supplied to the processing elements in the input layer. Each processing element is fully connected to other processing elements in the next layer where a predetermined calculation operation is carried out. In other words, the training input is fed through to the output. At the output layer the error is found using, for example, a sigmoid function and is propagated back to modify the weight on a connection. The goal is to minimize the error so that the weights are repeatedly adjusted and updated until the network reaches a satisfactory level of performance. A graphical representation of sigmoid functions is shown in FIG. 3.

Figure 3:
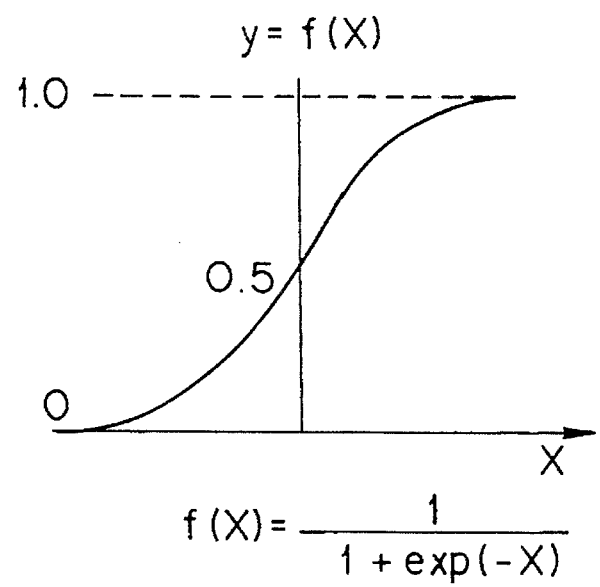
FIG. 3 is a graphical representation of a sigmoid function used as a transfer function for training neural networks.

In this embodiment a sigmoid function as shown in FIG. 3 is applied as the transfer function for the network. The sigmoid function is a bounded differentiable real function that is defined for all real input values and that has a positive derivative everywhere. The central portion of the sigmoid (whether it is near 0 or displaced) is assumed to be roughly linear. With the sigmoid function it becomes possible to establish effective neural network models.

As a sigmoid function parameter in each layer, a y-directional scale and a y-coordinate offset are defined. The y-directional scale is defined for each layer to exhibit exponential variation. This results in improved convergence efficiency of the network.

It is readily understood that other functions may be used as the transfer function. For example, in a sinusoidal function a differential coefficient for the input sum in each processing element is within a range equal to that for the original function. To use the sinusoidal function results in extremely high convergence of training though the hardware for implementing the network may be rather complex in structure.

An embodiment of the present invention is described with reference to FIGS. 4 through 9.

Figure 4:
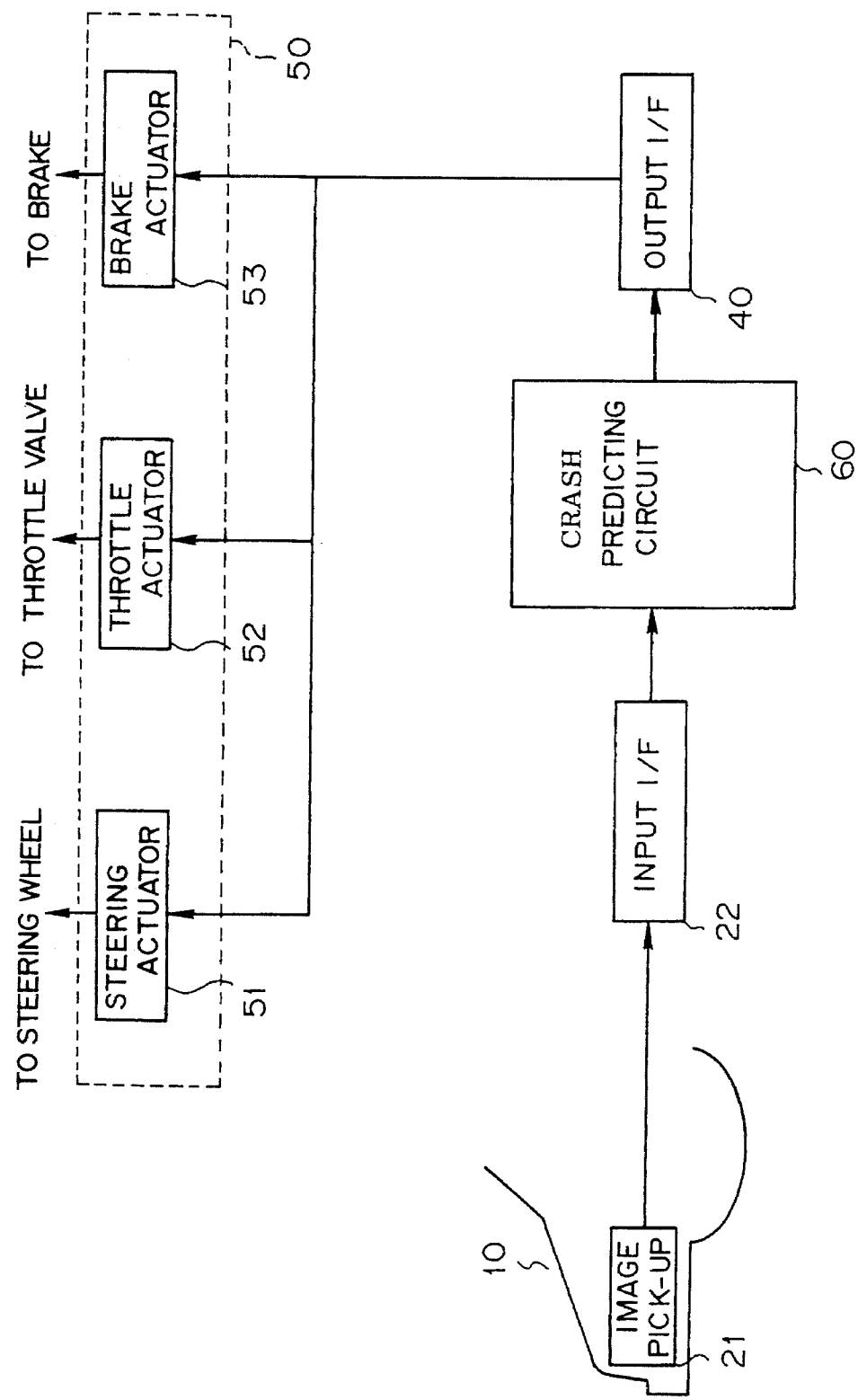
FIG. 4 is a block diagram of a system for predicting and evading crash of a vehicle using neural networks according to the first embodiment of the present invention.

FIG. 4 is a block diagram of a system for predicting and evading crash of a vehicle using neural networks according to the first embodiment of the present invention. A system in FIG. 4 is similar in structure and operation to that illustrated in FIG. 1 other than a crash predicting circuit 60. Description of the similar components will thus be omitted by the consideration of evading redundancy. FIG. 5 is a schematic structural diagram of the crash predicting circuit 60 illustrated in FIG. 4 formed by a neural network of three layers.

Figure 5A:
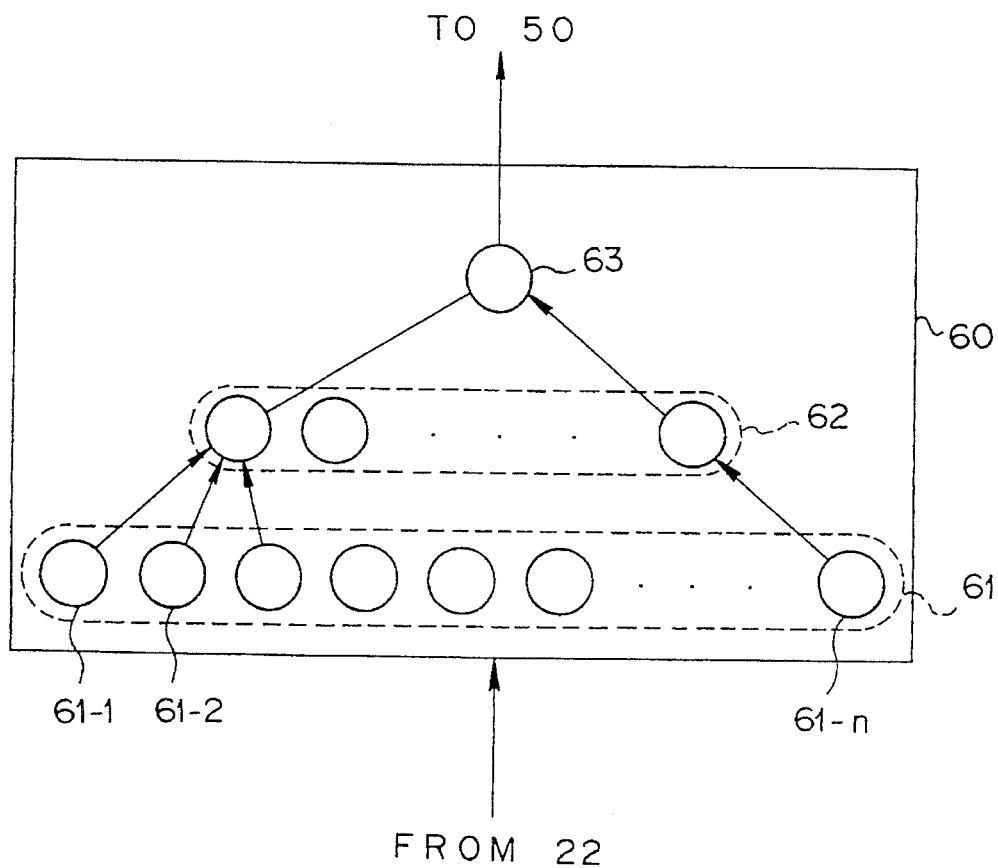
FIG. 5(a) is a schematic structural diagram of a crash predicting circuit in FIG. 4 realized by a neural network of three layers.
Figure 5B:
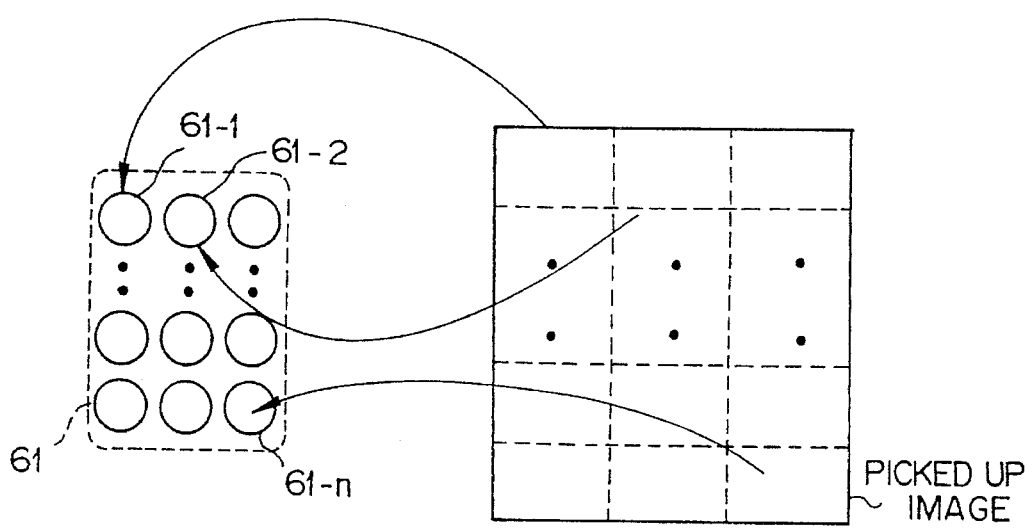
FIG. 5(b) shows an example of an input layer consisting of a two-dimensional array of processing elements of the neural network shown in FIG. 5(a)

The crash predicting circuit 60 in this embodiment is implemented by a neural network architecture of a hierarchical design with three layers as shown in FIG. 5(a). The input layer 61 consists of n processing elements 61-1 through 61-n arranged in parallel as a one-dimensional linear form. Each processing element in the input layer 61 is fully connected in series to the processing elements in a hidden layer 62 of the network. The hidden layer 62 is connected to an output layer 63 of a single processing element to produce an operational command described below. FIG. 5(b) shows an input layer consisting of a two-dimensional array of processing elements. In this event, the image data are supplied to the input layer as a two-dimensional data matrix of n divisions. Basically, the input and the hidden layers can have any geometrical form desired. With the two-dimensional array, the processing elements of each layer may share the same transfer function, and be updated together. At any rate, it should be considered that each processing element is fully interconnected to the other processing elements in the next layer though only a part of which are shown in FIG. 5(a) to evade complexity.

Figure 6A:
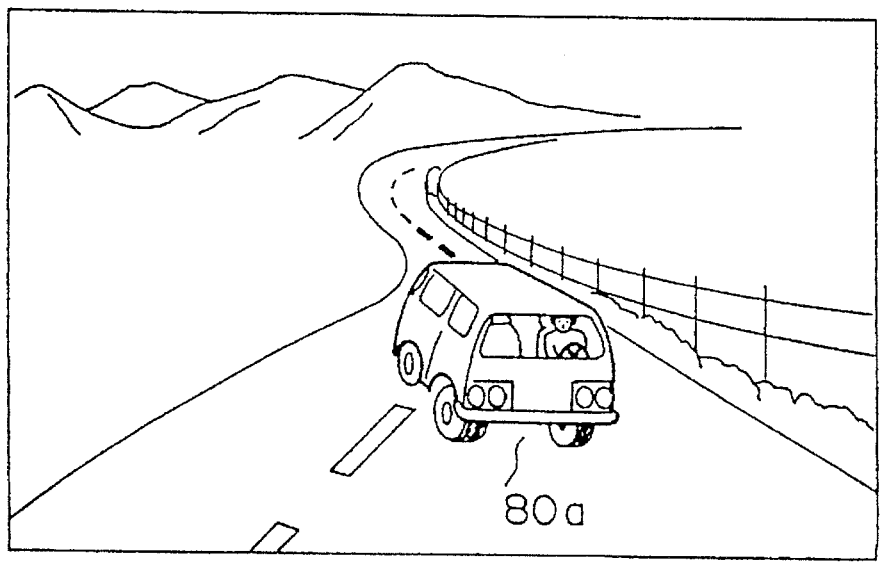
FIGS. 6(a) and 6(b) are exemplified views picked up, as the training image data supplied to the neural network, at different time instances during driving an experimental vehicle.
Figure 6B:
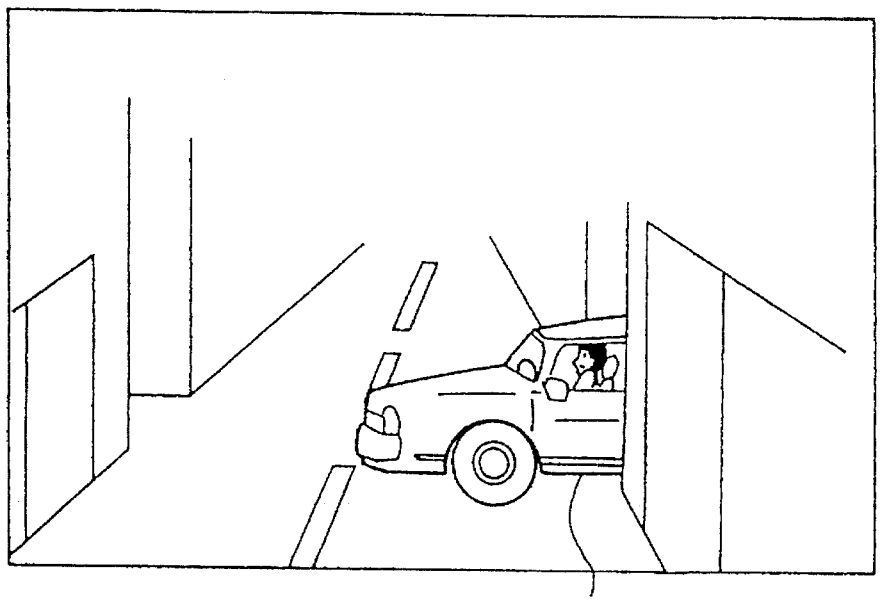

Referring now to FIG. 6 in addition to FIG. 5, illustrated are views picked up, as the image data for use in training the neural network. The image pick-up device 21 picks up ever-changing images as analog image data as described above in conjunction with the conventional system. This image pick-up device 21 is also any one of suitable devices such as a CCD camera. The image pick-up operation is carried out during running of a vehicle at higher speed than a predetermined one. The image data are subject to sampling for a sampling range $_\Delta T$ at a predetermined sampling interval $_\Delta t$. The image data are collected before and just after pseudo crash. The image pick-up range of the image pick-up device 21 corresponds to a field of view observed through naked eyes. A view shown in FIG. 6(a) is picked up when a station wagon (estate car) 80a on the opposite lane comes across the center line. A view shown in FIG. 6(b) is picked up when an automobile 80b suddenly appears from a blind corner of a cross-street. These ever-changing images are collected as the training data for the neural network.

The image data effectively used for the crash evasive purpose are those which allow continuous recognition of the ever-changing views before and just after pseudo crash. With this respect, the image pick-up device 21 picks up the images of a vehicle or other obstructions form a relatively short distance. In addition, the picked up images preferably are distinct reflections from the outside views.

The data elements consisting of one image are simultaneously supplied to the input layer 61 in parallel. In other words, each data element is supplied to the respective processing element of the input layer 61. The digital image data may be normalized before being supplied to the input layer 61 to increase a data processing speed. However, each processing element of the input layer 61 essentially receives the data element obtained by dividing the image data previously. The data elements are subjected to feature extraction when supplied to the hidden layer 62.

In typical image processing, feature extraction is carried out according to any one of various methods of pattern recognition to clearly identify shapes, forms or configurations of images. The feature-extracted data are quantized to facilitate subsequent calculations. In this event, separate analytical procedure is used for region partitioning or for extraction of configuration strokes. In other words, a particular program is necessary for each unit operation such as region partitioning, feature extraction, vectorization and so on. Compared with this, the prediction system according to the present invention requires no program based on each operation or procedure because a unique algorithm is established on completion of network training. This single algorithm allows to perform necessary functions without using separate algorithms or programs.

In a preferred embodiment, the feature extraction is directed to the configuration of an object defining the driving lanes such as shoulders, curbs, guard rails or the center line. The feature may also be extracted on regions such as carriageways. The neural network learns these configurations and regions during training process. This process is continued until the network reaches a satisfactory level of performance. The neural network is thus trained while carrying out feature extraction on the input image. Weights are adjusted after every trial on the quantized image data, so that the latest training data is weighted according to the latest result of adjustment and then supplied to the hidden layer 62. In addition, the neural network can be trained with image data including an object at time-varying positions. In this event, any one of suitable methods may be used for digital image processing.

In the present embodiment, each digital data indicative of a view at a certain sampling time instance is divided into n data elements. A product of n represents a positive integer which is equal in number to the processing elements in the input layer 61. In other words, the series of time sequential data are picked up as continuous n data elements to be supplied in parallel to the n by m processing elements in the input layer 61 as the training data. At the same time, an operational signal is supplied to the output layer 63 of the network as teacher data. The operational signal may be a logic "1" for representing crash of the automobile 10 after elapse of a predetermined time interval from the sampling time instant corresponding to the image data just having been supplied to the input layer 61.

In the same manner, the picked up image data and its corresponding teacher data are successively supplied to the crash predicting circuit 60. The crash predicting circuit 60 is continuously trained until the network reaches a satisfactory level of performance. After completion of training, the network is capable of matching the picked up image with the possibility of crash. The accuracy of prediction is improved by means of supplying images for a case of "safe" state to the neural network on learning.

The neural network thus learns the relative position between the vehicle on which it is mounted and objects at a short distance ahead of the vehicle. As a result of this learning, the crash predicting circuit 60 enables prediction of crash expected to happen a few seconds later according to this relative position. While outside views change every moment and a vehicle in practice encounters various objects and situations, a series of repeated training can yield stereotyped data patterns.

The neural network program that has already been trained can be memorized in a read only memory (ROM) as an application. In this event the network program is memorized after being compiled and translated into a machine language. The ROM is implemented in a predetermined IC chip or the like as an inherent circuit. The IC chip is mounted on a circuit for the air bag system in an automobile.

As mentioned above, the crash predicting circuit 60 supplies the operational signal to the safety drive ensuring arrangement 50 when it predicts occurrence of crash. In response to this operational signal the safety drive ensuring arrangement 50 can perform proper function to evade crash.

Figure 7:
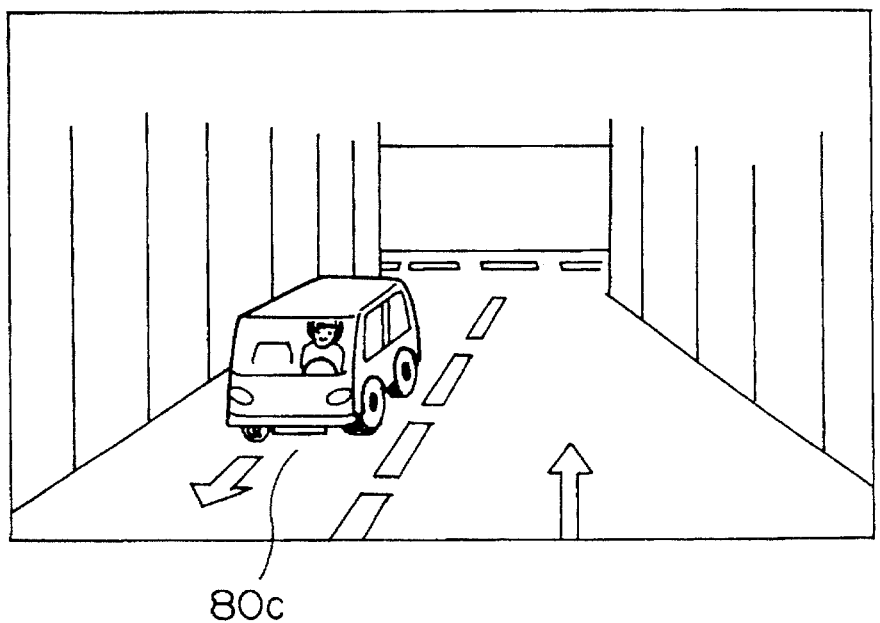
FIG. 7 is a view showing an example of an image data obtained during driving a utility vehicle.

For more clear understanding of the present invention, two cases where automobiles 80a, 80d running in "safe" state are explained. FIG. 7 shows an exemplified image including an oncoming vehicle 80c running on the opposite lane. The situation being far from danger as shown in FIG. 7 may allow the system of the present invention to bypass the crash predicting circuit 60. Alternatively, the crash predicting circuit 60 may produce an operational signal of logic "0" to represent this "safe" condition.

Figure 8:
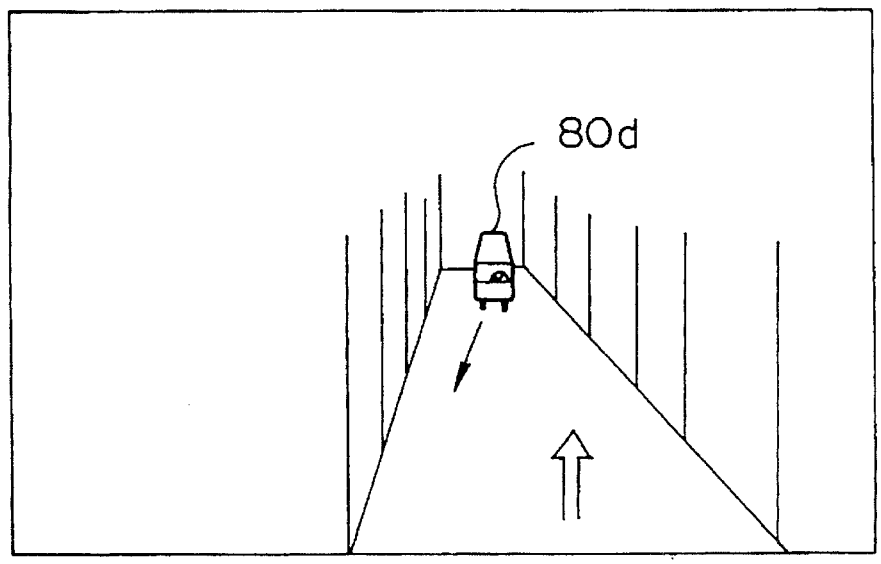
FIG. 8 is a view showing another example of an image data obtained during driving a utility vehicle.

A view shown in FIG. 8 represents a situation when a vehicle 80d on the opposite lane comes across the center line in the far distance ahead. The vehicle 80d is going to return to the lane where it ought to be. The subsequent image data indicate that the oncoming vehicle 80d takes an action to evade crash. In other words, the oncoming vehicle 80d is expected to return to the proper lane before the vehicle mounting the crash predicting circuit 60 passes by the vehicle 80d. Accordingly, the crash predicting circuit 60 determines that there are no hazardous objects ahead.

If a vehicle on the opposite lane comes across the center line or a vehicle suddenly appears from a blind corner of a cross-street as shown in FIGS. 5(a) and 5(b), the crash predicting circuit 60 carries out prediction operation in accordance with the image data showing these situations. Expected hazards make the crash predicting circuit 60 actuate the safety drive ensuring arrangement 50 in the manner described above.

Another embodiment of the present invention will be described below in which the neural network comprises an intermediate layer having a self-organization function and a competitive learning function to positively respond to various unknown data with less training data. As well known in the art, in the self-organization a network modifies itself in response to inputs. Examples of the use of self-organizing training include the competitive learning law applied to the present embodiment.

Figure 9:
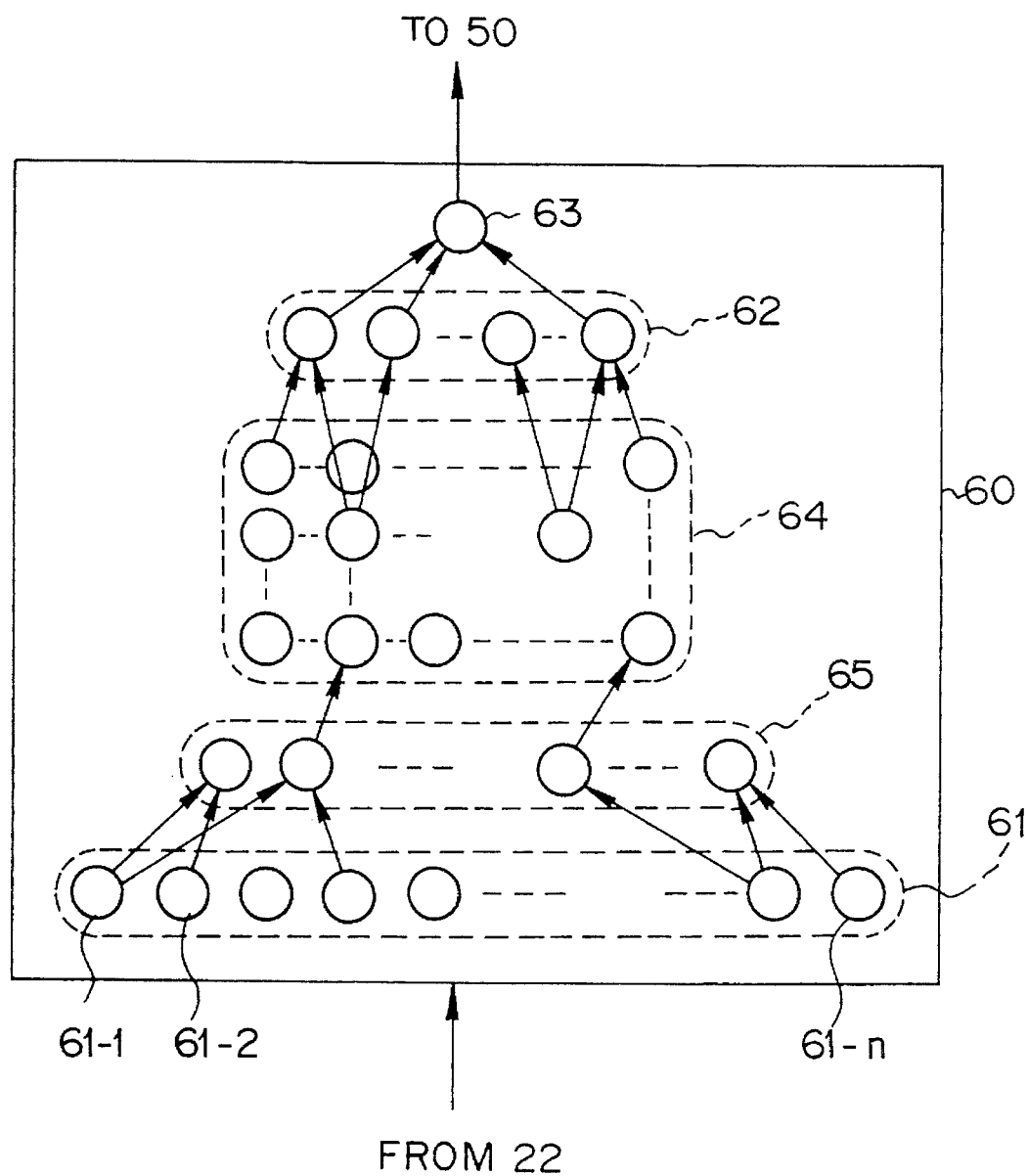
FIG. 9 is a block diagram of a system for predicting and evading crash using neural networks according to the second embodiment of the present invention.

As shown in FIG. 9 the neural network according to this embodiment comprises a two-dimensional self-organized competitive learning layer 64 interposed between the input layer 61 and the hidden layer 62. The two-dimensional self-organized competitive learning layer 64 is referred as to the two-dimensional Kohonen layers (2D-K layer) which in this embodiment comprises p by q layers consisting of a two-dimensional array of processing elements. The input layer 61 may consist of either one or two-dimensional array of processing elements. The 2D-K layer 64 can have any geometrical form desired. In this embodiment, it is also considered that each processing element is fully interconnected to the other processing elements in the next layer though only a part of which are shown in FIG. 9 to evade complexity.

The processing elements in the 2D-K layer 64 compete with one another to determine the "winner" on the basis of minimum distance. More particularly, a predetermined distance can be obtained by, in this embodiment, n processing elements for each set of the input data. The similarity for each of the n input data corresponds to the distance to select similar combination of processing elements. The selected processing elements becomes "winner" for facilitating determination on attributes of unknown data.

More particularly, the winning three Kohonen's processing elements are determined among the fourth processing elements to supply output data. Unknown data are preprocessed on the basis of classification for the input data due to the self-organization on learning. The output value thereof is supplied to the subsequent hidden layer.

With an additional normalization layer 65 may be interposed between the input layer 61 and the 2D-K layer 64 as shown in FIG. 9. With this normalization layer 65, the learning efficiency in the 2D-K layer 64 will be sufficiently improved. Addition of the 2D-K layer 64 contributes to a surprising number of information processing capabilities for unknown data as well as a remarkably improved convergence efficiency on learning.

The neural network having the 2D-K layer can be completed by means of expanding the above mentioned back propagation method so that the learning procedure can be determined in a similar manner as in the back propagation method.

The self-organization requires that the system uses, during adaptation of initial several thousands times, no other information other than the incoming patterns and no data are fed back from the output layer. After completion of self-organization the network is trained according to the back propagation algorithm. The neural network having a structure according to this embodiment can be trained with less data for a shorter period of training cycle.

In the above mentioned second embodiment, the neural network already trained can be coded by using a programming language such as C-language. The network may be used as an imperative application system or packaged as a control microprocessor. In this event, the network can be memorized in a read only memory for every one type of commercial vehicles.

For algorithm that can be logically established easily a well-known expert system may be applied to achieve a prediction system using a combination of logic circuit for the neural network and the expert system.

While the above embodiments have thus been described in conjunction with automatic crash evasive operation, it is possible to give precedence to the driver's operation. For example, it is possible to issue appropriate warnings to the driver before actuation of the safety drive ensuring arrangement 50. For this purpose, an audible signal such as an alarm sound may be generated to alert the driver to potential hazards.

It should be understood that the present invention is not limited to the particular embodiments shown and described above, and various changes and modifications may be made without departing from the spirit and scope of the appended claims.

What is claimed is:

1. A system for predicting and evading crash of a vehicle comprising:

image pick-up means mounted on the vehicle for picking up images of actual views in a direction of running of the vehicle while running of the vehicle, crash predicting means having a neural network, said neural network containing previously taken image data formed of successive scenes for causing accidents and being trained by a back propagation method for recognizing conditions in image data which cause said accidents, said neural network having an input layer formed of processing elements arranged parallel to each other, said input layer continuously receiving actual image data obtained from the image pick-up means, said neural network receiving the actual image data obtained from the image pick-up means while running of the vehicle, evaluating the actual image data by comparing it to said previously taken image data for causing the accidents, judging if the vehicle is predicted to crash based on the comparison of said previously taken image data with an object noticed in the actual image data of the image pick-up means, and outputting an operational signal in case of prediction of occurrence of a crash with said object, and safety drive ensuring means connected to said crash predicting means, said safety drive ensuring means, in response to the operational signal, operating to evade the crash between the vehicle and the object for protecting an occupant of the vehicle.

2. A system as claimed in claim 1, wherein said neural network further includes an output layer formed of a single processing element and connected to the processing elements of the input layer in series, said input layer instantaneously receiving said actual image data from the image pick-up means, and said output layer outputting a binary signal for indicating if said crash is predicted to occur in response to the actual image data inputted to the input layer.

3. A system as claimed in claim 2, wherein in a training of the neural network by the back propagation method, said input layer receives the previously taken image data formed of successive scenes for causing the accidents and receives said binary signal from said output layer indicating that the accidents occurred in said successive scenes, said neural network, during the driving of the vehicle after the training, evaluating said actual image data obtained from the image pick-up means to determine if it corresponds to said previously taken image data for causing accidents.

4. A system as claimed in claim 3, wherein said neural network containing trained data is memorized in a ROM for constituting the crash predicting means, said ROM being included in a circuit for the safety drive ensuring means.

* * * * *